(12) United States Patent
Kessler

(10) Patent No.: US 7,043,892 B1
(45) Date of Patent: May 16, 2006

(54) MULTIPLE BALING SYSTEM

(76) Inventor: Anthony Kessler, 11297 371st Ave., Wetonka, SD (US) 57481

( * ) Notice: Subject to any disclaimer, the term of this patent is extended or adjusted under 35 U.S.C. 154(b) by 0 days.

(21) Appl. No.: 10/909,868

(22) Filed: Aug. 2, 2004

(51) Int. Cl.
*A01D 76/00* (2006.01)
*A01D 78/00* (2006.01)
*A01D 80/00* (2006.01)
*A01D 84/00* (2006.01)

(52) U.S. Cl. ...................................................... 56/341
(58) Field of Classification Search ................ 56/341, 56/13.5, 15.1, 14.7, DIG. 9, DIG. 14; 100/88
See application file for complete search history.

(56) References Cited

U.S. PATENT DOCUMENTS

| | | | |
|---|---|---|---|
| 3,990,718 A | 11/1976 | Holland | |
| 4,018,036 A | 4/1977 | Cicci | |
| 4,065,914 A | 1/1978 | Phillips et al. | |
| 4,382,608 A | 5/1983 | Konz | |
| 4,415,174 A | 11/1983 | Koehn | |
| 4,433,533 A | 2/1984 | Giani | |
| 4,510,861 A | 4/1985 | Campbell et al. | |
| 4,744,580 A | 5/1988 | Ryan | |
| 4,796,417 A | 1/1989 | van Der Lely | |
| 5,024,456 A | 6/1991 | Hadley et al. | |
| 5,136,831 A * | 8/1992 | Fell et al. | 56/341 |
| 5,713,192 A * | 2/1998 | Robinson | 56/13.5 |
| 5,964,078 A * | 10/1999 | Robinson | 56/13.5 |
| 6,000,206 A | 12/1999 | Case et al. | |
| 6,178,728 B1 * | 1/2001 | Rowse et al. | 56/15.5 |
| 6,585,057 B1 * | 7/2003 | Hainsworth | 172/677 |

* cited by examiner

Primary Examiner—Árpád Fábián Kovács

(57) ABSTRACT

A multiple baling system for allowing a user to bale hay from a field. The multiple baling system includes a frame assembly being designed for being towed behind the tractor. Each of a plurality of baling implements is pivotally coupled to the frame assembly. A drive assembly is coupled to the frame assembly and is coupled to a power take off of the tractor for transferring power to the baling implements. The frame assembly is selectively actuated to selectively change the positioning of the baling implements to allow the baling implements to collect the bay from the field.

15 Claims, 3 Drawing Sheets

MULTIPLE BALING SYSTEM

BACKGROUND OF THE INVENTION

1. Field of the Invention

The present invention relates to implement towing apparatuses and more particularly pertains to a new multiple baling system for allowing a user to more efficiently bale hay from a field.

2. Description of the Prior Art

The use of implement towing apparatuses is known in the prior art. U.S. Pat. No. 4,415,174 describes a device for allowing multiple implements to be aligned directly behind the tractor for transportation of the implements and allowing the implements to be deployed such that each the implements can be used simultaneously when in the field. Another type of implement towing apparatus is U.S. Pat. No. 5,0224,456 having a hitch structure that allows pair of implements to be towed in a tandem arrangement and then allows the deployment of one of the implements away from the other to allow the implements to be used simultaneously. U.S. Pat. No. 4,382,608 has a system for towing a pair of implements side by side while the implements are being used and then realigning the implements so that the implements are aligned with the hitch structure positioned between the implements with the tractor being hitched to one of the implements to allow for easier towing along a road. U.S. Pat. No. 4,796,417 has a baler with two winding spaces positioned side by side so that a pickup device feeds the crops into one of the winding spaces and then switches to the other one of the winding spaces when the first of the winding spaces forms a bale. U.S. Pat. No. 6,006,206 has an in-line baler that has tongue that can be selectively swung from a centered position to an offset position as desired by the user. U.S. Pat. No. 5,713,192 has a tow bar implement allowing for multiple balers may be towed behind a tractor to bale several swaths of hay simultaneously. U.S. Pat. No. 4,018,036 has an arched hitching tongue that extends from a harvester to the tractor and allows the harvester to switched to either side of the tractor for harvesting crops from adjacently positioned swaths of crops. U.S. Pat. No. 4,433,533 has a baler that automatically detects any lack of uniformity in the diameter of the round bale being formed by the baler and repositions the baler with respect to the swath of crop being collected to redirect the collection of the crop to compensate for the differences in diameter of the bale being formed. U.S. Pat. No. 4,065,914 has a baler that is towed behind a tractor with the baler being offset from the tractor with a draft tongue that can be used to reposition the baler to allow for even pick up of the crop to allow round bales of even diameter to be made. U.S. Pat. No. 5,136,831 has a round baler that allows a second round bale to be started when a first round bale is completed and as the second bale grows the first bale is discharged from the baler. U.S. Pat. No. 4,744,580 has a tow hitch that is coupled to a lawn tractor that allows two other lawn implements to be coupled to the lawn tractor to allow the lawn tractor to tow the implements. U.S. Pat. No. 4,510,861 has a baling machine that allows for two bales to formed at the same time where one bale is formed and discharged while the other bale is being formed to allow for continuous baling. U.S. Pat. No. 6,585,057 has a hydraulic twin hitch to allow for twin hay balers by a tractor. U.S. Pat. No. 3,990,718 has a unit for allowing a pair of agricultural implements to be pulled simultaneously in tandem or in an offset position from each other.

While these devices fulfill their respective, particular objectives and requirements, the need remains for a system that has certain improved features allowing for a more efficient gathering and baling of hay from a field.

SUMMARY OF THE INVENTION

The present invention meets the needs presented above by providing a frame assembly that is pivoted to allow adjusting of the baling implements to provide the best collection of the hay from the filed.

Still yet another object of the present invention is to provide a new multiple baling system that diverts hay that is going to pass between the baling implements to in front of the baling implements to be collected and baled by the baling implements.

To this end, the present invention generally comprises a frame assembly being designed for being coupled to the tractor whereby the frame assembly is towed behind the tractor. A drive assembly is coupled to the frame assembly. The drive assembly is designed for being coupled to a power take off of the tractor. Each of a plurality of baling implements is pivotally coupled to the frame assembly. Each of the baling implements is operationally coupled to the drive assembly whereby the drive assembly is designed for transferring power from the power take off of the tractor to the baling implements. The frame assembly is selectively actuated to selectively change the positioning of the baling implements 16 to allow the baling implements to efficiently collect the hay from the field.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
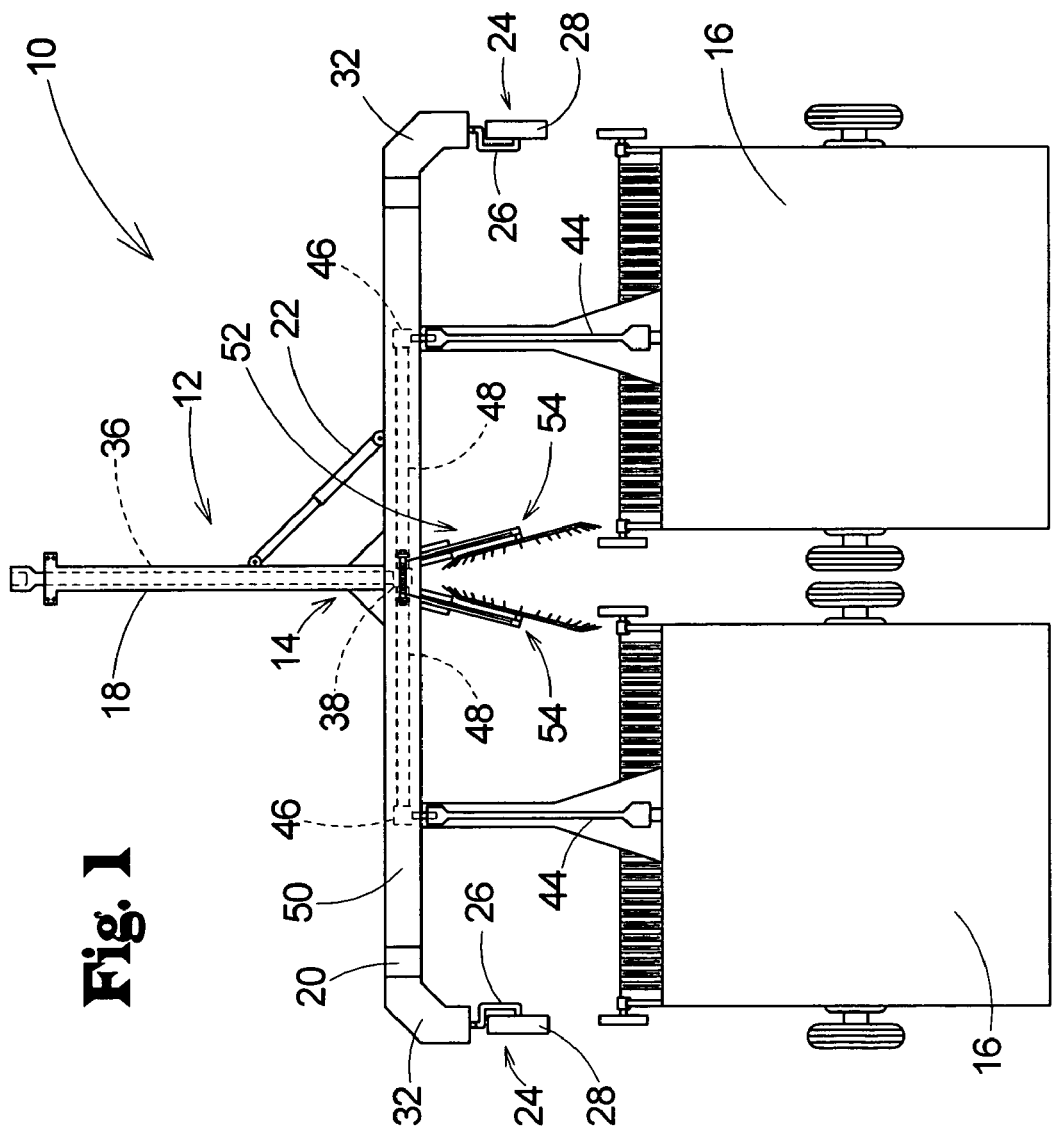
FIG. 1 is a top view of a new multiple baling system according to the present invention.
Figure 2:
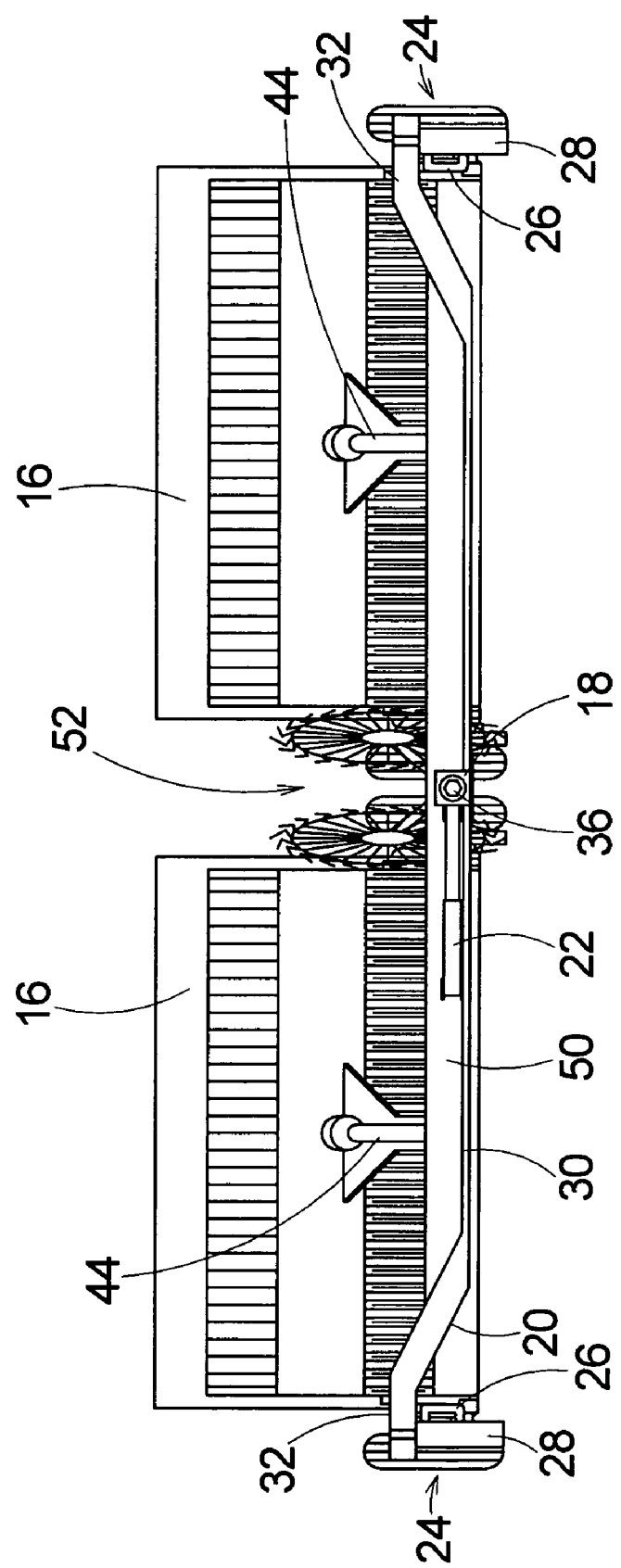
FIG. 2 is a front view of the present invention.
Figure 3:
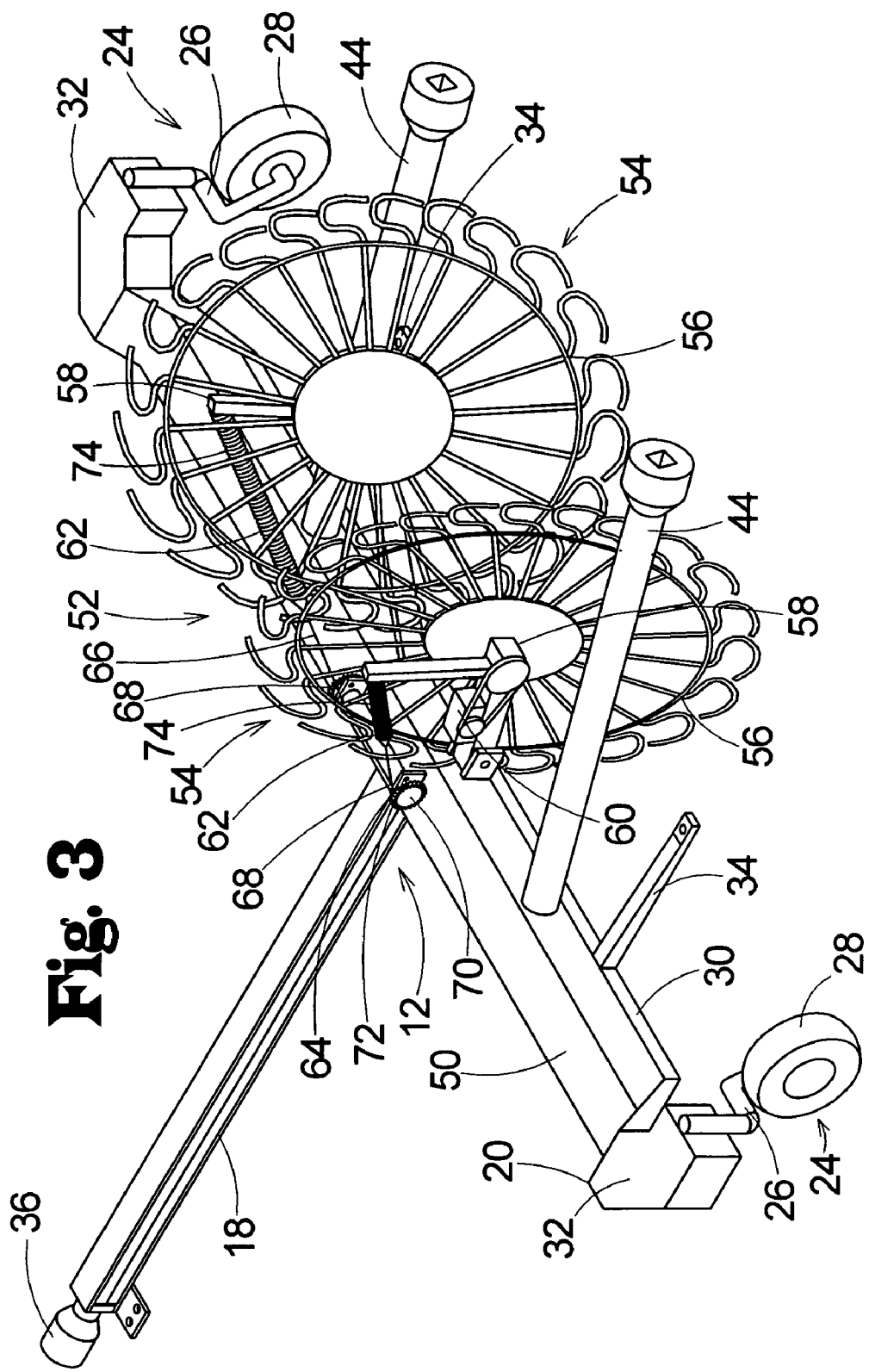
FIG. 3 is a perspective view of the present invention without the baling implements.

With reference now to the drawings, and in particular to FIGS. 1 through 3 thereof, a new multiple baling system embodying the principles and concepts of the present invention and generally designated by the reference numeral 10 will be described.

As best illustrated in FIGS. 1 through 3, the multiple baling system 10 generally comprises a frame assembly 12 being designed for being coupled to the tractor whereby the frame assembly 12 is towed behind the tractor.

A drive assembly 14 is coupled to the frame assembly 12. The drive assembly 14 is designed for being coupled to a power take off of the tractor.

Each of a plurality of baling implements 16 is pivotally coupled to the frame assembly 12. Each of the baling implements 16 is operationally coupled to the drive assembly 14 whereby the drive assembly 14 is designed for transferring power from the power take off of the tractor to the baling implements 16. The frame assembly 12 is selectively actuated to selectively change the positioning of the baling implements 16 to allow the baling implements 16 to efficiently collect the hay from the field.

The frame assembly 12 comprises a tongue member 18 and a bar member 20. The bar member 20 is pivotally coupled to the tongue member 18 whereby the bar member 20 is selectively pivoted with respect to the tongue member 18. The bar member 20 is pivotally coupled to the baling implements 16 whereby the baling implements 16 pivot with respect to the bar member 20 when the bar member 20 is pivoted with respect to the tongue member 18. The tongue member 18 is designed for being selectively coupled to the tractor to couple the bar member 20 and the baling implements 16 to the tractor. The bar member 20 has a length of about 15 feet.

The frame assembly 12 comprises an actuation member 22, such as a hydraulic ram. The actuation member 22 is coupled to the tongue member 18 and the bar member 20. The actuation member 22 is selectively actuated to pivot the bar member 20 with respect to the tongue member 18. The actuation member 22 is designed for being operationally coupled to the tractor to allow a user in the tractor to selectively actuate the actuation member 22 to pivot the bar member 20 with respect to the tongue member 18 when the user wishes to adjust positioning of the baling implements 16.

The frame assembly 12 comprises a pair of wheel assemblies 24. The wheel assemblies 24 are rotatably coupled to the bar member 20. The wheel assemblies 24 rotate with respect to the bar member 20 when the bar member 20 is pivoted with respect to the tongue member 18. The wheel assemblies 24 are designed for facilitating movement of the frame assembly 12 across the field.

Each of the wheel assemblies 24 comprises a support member 26 and a wheel 28. The support member 26 of each of the wheel assemblies 24 is rotatably coupled to opposing ends of the bar member 20 whereby the support member 26 rotates with respect to the bar member 20 when the bar member 20 is pivoted with respect to the tongue member 18. The wheel 28 of each of the wheel assemblies 24 is rotatably coupled to the support member 26 of the associated one of the wheel assemblies 24 whereby the wheel 28 is designed for rolling across the field to facilitate movement of the frame assembly 12 across the field.

The bar member 20 comprises a base portion 30 and a pair of riser portions 32. The riser portions 32 are oppositely coupled to the base portion 30 whereby each of the riser portions 32 extends upwardly and outwardly from the base portion 30. One of the wheel assemblies 24 is pivotally coupled to an associated one of the riser portions 32 whereby the riser portions 32 provides clearance for the wheel assemblies 24 to rotate without impedance from the bar member 20 when the bar member 20 is pivoted with respect to the tongue member 18. The riser portions 32 are about 13 inches above the base portion 30.

The frame assembly 12 comprises a pair of draw members 34. Each of the draw members 34 is coupled to the bar member 20 whereby the draw members 34 are positioned opposite the tongue member 18. Each of the draw members 34 is pivotally coupled to one of the baling implements 16 whereby the draw members 34 separate the baling implements 16 from the bar member 20 to inhibit the baling implements 16 impacting the bar member 20 when the bar member 20 is pivoted with respect to the tongue member 18. Each of the draw members 34 has length of about 18 inches and are positioned about 17 inches from the ground to provide plenty of clearance.

The drive assembly 14 comprises a power shaft 36 and a transfer assembly 38. The transfer assembly 38 is coupled to the frame assembly 12. The power shaft 36 is designed for being operationally coupled between the power take off of the tractor and the transfer assembly 38 whereby the power shaft 36 transfers rotational movement of the power take off of the tractor to the transfer assembly 38. The transfer assembly 38 is operationally coupled to the baling implements 16 to actuate the baling implements 16 to collect and bale the hay. The transfer assembly 38 may comprise a gear box having an input shaft and a pair of output shafts positioned at about 90 degrees from the input shaft.

The drive assembly 14 comprises a pair of transfer shafts 44. Each of the transfer shafts 44 is operationally coupled between the transfer assembly 38 and one of the baling implements 16 whereby each of the transfer shafts 44 transfers rotational movement from the transfer assembly 38 to the associated one of the baling implements 16 to actuate the baling implements 16 to collect and bale the hay.

The drive assembly 14 comprises a pair of medial assemblies 46. Each of the medial assemblies 46 is operationally coupled between the transfer assembly 38 and one of the transfer shafts 44 whereby each of the medial assemblies 46 for transferring rotational movement from the transfer assembly 38 to the associated one of the transfer shafts 44.

The drive assembly 14 comprises a pair of medial shafts 48. Each of the medial shafts 48 is operationally coupled between the transfer assembly 38 and one of the medial assemblies 46. Each of the medial shafts 48 is rotated by the transfer assembly 38 whereby each of the medial shafts 48 transfers rotational movement to the associated one of the medial assemblies 46 to rotate the transfer shafts 44 coupled to the medial assemblies 46.

A cover member 50 is coupled to the frame assembly 12. The cover member 50 is positioned over the transfer assembly 38, the medial assemblies 46 and the medial shafts 48. The cover member 50 is for providing protection for the transfer assembly 38, the medial assemblies 46 and the medial shafts 48 from being inadvertently damaged.

A diverting assembly 52 is coupled to the frame assembly 12. The diverting assembly 52 is positioned ahead of the baling implements 16 whereby the diverting assembly 52 is for diverting hay that is to pass between the baling implements 16 towards the baling implements 16 to be collected and baled by the baling implements 16.

The diverting assembly 52 comprises a plurality of raking means 54 for raking the hay from the field towards the baling implements 16 to be collected and baled by the baling implements 16. Each of the raking means 54 comprises a wheel rake 56 and a support frame 58. The support frame 58 is pivotaly coupled to the frame assembly 12. The wheel rake 56 is rotatably coupled the frame assembly 12 of the associated one of the raking means 54 whereby rotation of the wheel rake 56 of each of the raking means 54 is for raking the hay towards the baling implements 16. The support frame 58 and the wheel rake 56 of each of the raking means 54 is positioned at angle from a center of the frame assembly 12 towards an associated one of the baling implements 16 to rake hay positioned to pass between the baling implements 16 to in front of the baling implements 16 to be collected and baled by the baling implements 16.

Each of the raking means 54 comprises a motor 60. The motor 60 is coupled to the support frame 58 of the associated one of the raking means 54. The motor 60 is operationally coupled to the wheel rake 56 of the associated one of the raking means 54 to rotate the wheel rake 56 to rake the hay to the baling implements 16. The motor 60 is operationally coupled to the hydraulic system of the tractor to allow the motor 60 of each of the raking means 54 to be actuated from inside the tractor.

The diverting assembly 52 comprises an adjustment means 62 for adjusting the height of the wheel rake 56 of each of the raking means 54 above the ground to inhibit the wheel rake 56 from inadvertently digging into the ground. The adjustment means 62 is coupled to the frame assembly 12 and is operationally coupled to the support frame 58 of each of the raking means 54 for pivoting the support frame 58 with respect to the frame assembly 12 to adjust the height of the wheel rake 56 of the associated one of the raking means 54 above the ground.

The adjustment means 62 comprises a reel member 64 and a cable member 66. The reel member 64 is rotatably coupled to the cover member with the cable member 66 being wound onto the reel member 64. The cable member 66 comprises a pair of opposing ends 68. One of the opposing ends 68 of the cable member 66 is coupled to the support frame 58 of one of the raking means 54 with the other one of the opposing ends 68 of the cable member 66 being coupled to the support frame 58 of the other one of the raking means 54. The reel member 64 is rotated to wind the cable member 66 onto the reel member 64 and raise the wheel rake 56 of each of the raking means 54 whereby rotation of the reel member 64 in the opposite direction unwinds the cable member 66 from the reel member 64 to lower the wheel rake 56 of each of the raking means 54.

The adjustment means 62 comprises a cog 70 and a pawl 72. The cog 70 is coupled to the reel member 64 whereby the cog 70 is rotated when the reel member 64 is rotated. The pawl 72 is pivotally coupled to the cover member whereby the pawl 72 selectively engages the cog 70 to inhibit rotation of the cog 70 and thereby the reel member 64 to secure the wheel rake 56 of each of the raking means 54 at a desired height above the ground.

Each of the raking means 54 comprises a biasing member 74, such as a spring. The biasing member 74 is coupled to the support frame 58 whereby the biasing member 74 is positioned between the support frame 58 of the associated one the raking means 54 and the associated one of the opposing ends 68 of the cable member 66. The biasing member 74 permits the wheel rake 56 of the associated one of the raking means 54 to maintain relative positioning with respect to the ground and compensating for rises and depressions in the ground to optimize the amount of the hay that is raked by the raking means 54 to the baling implements 16.

In use, the user actuates the actuation member 22 to pivot the bar member 20 with respect to the tongue member 18 to position the baling implements 16 in the desired position. As the tractor pulls the baling implements 16 along the power take off of the tractor actuates the drive assembly 14 to actuate the baling implements 16. The motor 60 of each of the raking means 54 of the diverting assembly 52 are actuated to rotate the wheel rakes 56 to allow the wheel rakes 56 to divert hay that is going to pass between the baling implements 16 to in front of the baling implements 16 to allow the hay to be collected and baled.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A multiple baling system for being drawn behind a tractor to bale of hay in a field, the multiple baling system comprising:

a frame assembly configured to be coupled to the tractor for extending in a longitudinal direction of the tractor at a position behind the tractor for towing;

a drive assembly being coupled to said frame assembly, said drive assembly being configured to be coupled to a power take off of the tractor when said frame assembly is coupled to the tractor for towing;

wherein said frame assembly comprises a substantially-longitudinally-extending tongue member and a substantially transversely-extending bar member, said bar member being coupled to said tongue member, said bar member being pivotally coupled to said tongue member opposite the tractor such that said bar member is pivotable with respect to said tongue member;

a plurality of baling implements each being pivotally coupled to the bar member of said frame assembly;

wherein said drive assembly comprises:

a power shaft for coupling to the power take off of the tractor to transfer the rotational motion of the power take off to the power shaft:

a transfer assembly mounted on said frame assembly and being operationally coupled to said power shaft in a manner such that said power shaft transfers rotational motion of the power take off of the tractor to said transfer assembly:

a pair of medial shafts each being operationally coupled to said transfer assembly in a manner such that said transfer assembly transfers rotational motion to each of said medial shafts:

a pair of medial assemblies each being operationally coupled to one of said medial shafts such that each of said medial shafts transfers rotational motion from the power take off to a respective one of said medial assemblies; and a pair of transfer shafts each being operationally coupled to one of said medial assemblies such that each of said medial assemblies transfers rotational motion to the associated one of said transfer shafts:

wherein each of said baling implements is operationally coupled to one of the transfer shafts of said drive assembly such that said drive assembly is capable of transferring rotational motion of the power take off of the tractor to said baling implements; and wherein said frame assembly comprises an actuation member for changing an orientation of said bar member with respect to said tongue member, said actuation member being coupled to said tongue member and said bar member to pivot said bar member with respect to said tongue member about a substantially vertical axis, said actuation member being selectively actuatable to pivot said bar member with respect to said tongue member to adjust positing of said baling implements with respect to the tractor.

2. The multiple baling system as set forth in claim 1, wherein said frame assembly comprises a pair of wheel assemblies, said wheel assemblies being rotatably coupled to said bar member, said wheel assemblies rotating with respect to said bar member when said bar member is pivoted with respect to said tongue member, said wheel assemblies being adapted for facilitating movement of said frame assembly across the field.

3. The multiple baling system as set forth in claim 2, wherein each of said wheel assemblies comprises a support member and a wheel, said support member of each of said wheel assemblies being rotatably coupled to said opposing ends of said bar member such that said support member rotates with respect to said bar member when said bar member is pivoted with respect to said tongue member, said wheel of each of said wheel assemblies being rotatably coupled to said support member of the associated one of said wheel assemblies such that said wheel is adapted for rolling across the field to facilitate movement of said frame assembly across the field.

4. The multiple baling system as set forth in claim 2, wherein said bar member comprises a base portion and a pair of riser portions, said riser portions being oppositely coupled to said base portion such that each of said riser portions extends upwardly and outwardly from said base portion, one of said wheel assemblies being pivotally coupled to an associated one of said riser portions such that said riser portions provides clearance for said wheel assemblies to rotate without impedance from said bar member when said bar member is pivoted with respect to said tongue member.

5. The multiple baling system as set forth in claim 1, wherein said frame assembly comprises a pair of draw members, each of said draw members being coupled to said bar member such that said draw members are positioned opposite said tongue member, each of said draw members being pivotally coupled to one of said baling implements such that said draw members separate said baling implements from said bar member to inhibit said baling implements impacting said bar member when said bar member is pivoted with respect to said tongue member.

6. The multiple baling system as set forth in claim 1, further comprising:
a cover member being coupled to said frame assembly, said cover member being positioned over said transfer assembly, said medial assemblies and said medial shafts, said cover member being for providing protection for said transfer assembly, said medial assemblies and said medial shafts from being inadvertently damaged.

7. The multiple baling system as set forth in claim 1, further comprising:
a cover member being coupled to said frame assembly, said cover member being positioned over said transfer assembly, said cover member being for providing protection for said transfer assembly from being inadvertently damaged.

8. The multiple baling system as set forth in claim 1, further comprising:
a diverting assembly being coupled to said frame assembly, said diverting assembly being positioned ahead of said baling implements such that said diverting assembly is for diverting hay that is to pass between said baling implements towards said baling implements to be collected and baled by said baling implements.

9. The multiple baling system as set forth in claim 8, wherein said diverting assembly comprising a plurality of raking means for raking the hay from the field towards said baling implements to be collected and baled by said baling implements.

10. The multiple baling system as set forth in claim 9, wherein each of said raking means comprises a wheel rake and a support frame, said support frame being pivotaly coupled to said frame assembly, said wheel rake being rotatably coupled to said frame assembly of the associated one of said raking means such that rotation of said wheel rake of each of said raking means is for raking the hay towards said baling implements.

11. The multiple baling system as set forth in claim 10, wherein said support frame and said wheel rake of each of said raking means are positioned at angle from a center of said frame assembly towards an associated one of said baling implements to rake hay positioned to pass between said baling implements to in front of the baling implements to be collected and baled by said baling implements.

12. The multiple baling system as set forth in claim 10, wherein each of said raking means comprises a motor, said motor being coupled to said support frame of the associated one of said raking means, said motor being operationally coupled to said wheel rake of the associated one of said raking means to rotate said wheel rake to rake the hay to said baling implements.

13. The multiple baling system as set forth in claim 10, wherein said diverting assembly comprises an adjustment means for adjusting the height of said wheel rake of each of said raking means above the ground to inhibit the wheel rake from inadvertently digging into the ground, said adjustment means being coupled to said frame assembly and being operationally coupled to said support frame of each of said raking means for pivoting said support frame with respect to said frame assembly to adjust the height of said wheel rake of the associated one of said raking means above the ground.

14. A multiple baling system for being drawn behind a tractor to bale of hay in a field, the multiple baling system comprising:
a frame assembly being adapted for being coupled to the tractor such that said frame assembly is towed behind the tractor;
a drive assembly being coupled to said frame assembly, said drive assembly being adapted for being coupled to a power take off of the tractor;
each of a plurality of baling implements being pivotally coupled to said frame assembly, each of said baling implements being operationally coupled to said drive assembly such that said drive assembly is adapted for transferring power from the power take off of the tractor to said baling implements, said frame assembly being selectively actuated to selectively change the positioning of said baling implements to allow said baling implements to efficiently collect the hay from the field;
said drive assembly comprising a power shaft and a transfer assembly, said transfer assembly being coupled to said frame assembly, said power shaft being adapted for being operationally coupled between the power take off of the tractor and said transfer assembly such that said power shaft transfers rotational movement of the power take off of the tractor to said transfer assembly, said transfer assembly being operationally coupled to said baling implements to actuate said baling implements to collect and bale the hay;

said drive assembly comprising a pair of transfer shafts, each of said transfer shafts being operationally coupled between said transfer assembly and one of said baling implements such that each of said transfer shafts transfers rotational movement from said transfer assembly to the associated one of said baling implements to actuate said baling implements to collect and bale the hay;

said drive assembly comprising a pair of medial assemblies, each of said medial assemblies being operationally coupled between said transfer assembly and one of said transfer shafts such that each of said medial assemblies for transferring rotational movement from said transfer assembly to the associated one of said transfer shafts; and said drive assembly comprising a pair of medial shafts, each of said medial shafts being operationally coupled between said transfer assembly and one of said medial assemblies, each of said medial shafts being rotated by said transfer assembly such that each of said medial shafts transfers rotational movement to the associated one of said medial assemblies to rotate said transfer shafts coupled to said medial assemblies.

15. A multiple baling system for being drawn behind a tractor to bale of hay in a field, the multiple baling system comprising:

a frame assembly being adapted for being coupled to the tractor such that said frame assembly is towed behind the tractor;

a drive assembly being coupled to said frame assembly, said drive assembly being adapted for being coupled to a power take off of the tractor;

each of a plurality of baling implements being pivotally coupled to said frame assembly, each of said baling implements being operationally coupled to said drive assembly such that said drive assembly is adapted for transferring power from the power take off of the tractor to said baling implements, said frame assembly being selectively actuated to selectively change the positioning of said baling implements to allow said baling implements to efficiently collect the hay from the field;

a diverting assembly being coupled to said frame assembly, said diverting assembly being positioned ahead of said baling implements such that said diverting assembly is for diverting hay that is to pass between said baling implements towards said baling implements to be collected and baled by said baling implements;

said diverting assembly comprising a plurality of raking means for raking the hay from the field towards said baling implements to be collected and baled by said baling implements; and each of said raking means comprising a wheel rake and a support frame, said support frame being pivotaly coupled to said frame assembly, said wheel rake being rotatably coupled to said frame assembly of the associated one of said raking means such that rotation of said wheel rake of each of said raking means is for raking the hay towards said baling implements.

* * * * *